Sept. 21, 1971 E. O. MORAGA 3,606,856
CICLO AMPHIBIOUS
Filed Jan. 6, 1969

3,606,856
CYCLO AMPHIBIOUS
Ernesto Octavio Moraga, Rincon 1239,
Buenos Aires, Argentina
Filed Jan. 8, 1969, Ser. No. 797,318
Int. Cl. B63f *3/00;* B63h *1/38*
U.S. Cl. 115—1             1 Claim

ABSTRACT OF THE DISCLOSURE

An amphibious apparatus that includes floaters, and a supporting structure together with means for operating the same.

---

This invention consists of an amphibious apparatus on two, three or more rotary floaters similar to wheels, spheres, cylinders, etc. that are able to roll over water, land, ice, muddy terrain, etc.

FIG. 1 shows the possibility of transforming a bicycle into an amphibious cycle by means of connecting a small device for that purpose to the crank axle A which connects to sphere B permitting same to rotate freely. On each end of the axle are the handles C which are to be used when driving the vehicle. Letter D indicates the position of the fenders.

This structure or diagram of a bicycle also is formed by a perpendicular axle marked E which goes through both rear spheres in the center of which F shows the position of the pinion attached to the pedals by means of a chain, in this way when pedaling same will make the spheres turn, moving both backwards or forward.

The photographs of the prototype made by myself in a somewhat precarious manner, and the toy clearly illustrate the effectiveness of the apparatus.

DESCRIPTION OF THE INVENTION

The cyclo-amphibious consists of a device capable of rolling forward and backwards over water, land, ice, sand and any other surfaces and is composed basically of rolling front and rear floaters.

Figure 1:
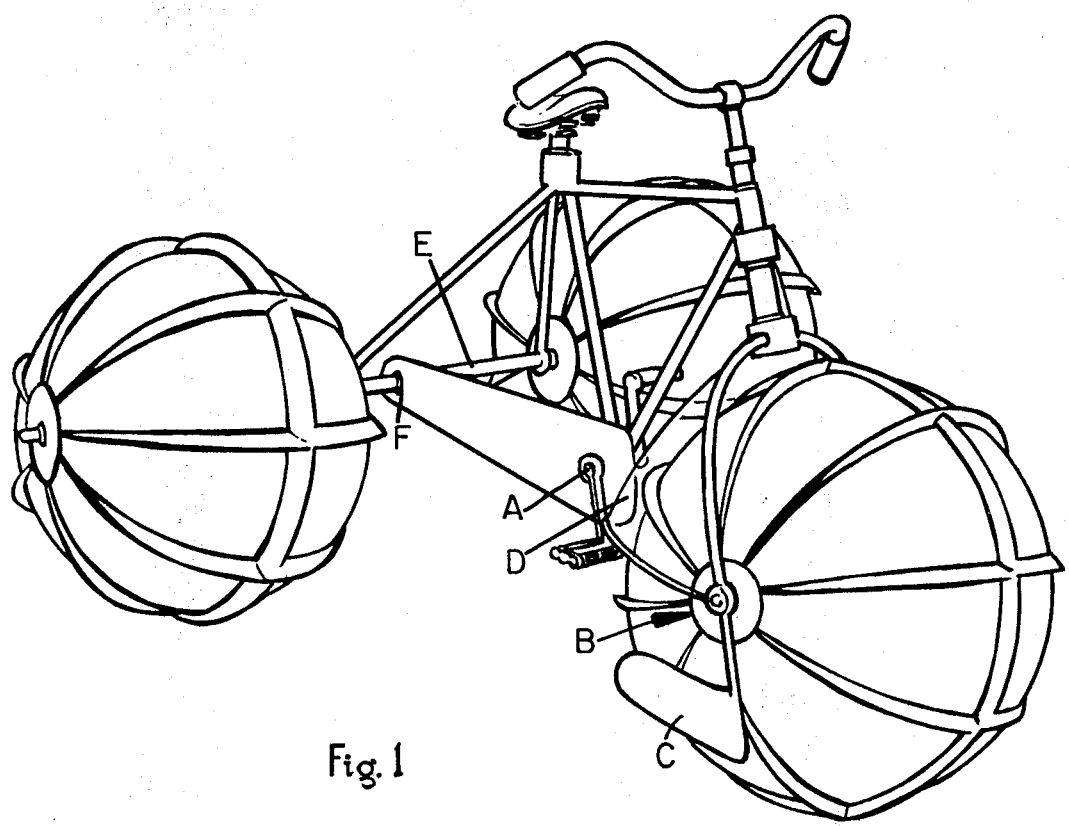

As an example of a form which it may adopt, I have considered one front sphere and two rear spheres assembled on a structure similar to a tricycle as illustrated in FIG. 1.

I am including also photographs of a prototype which shows an amphibious-tricycle on water proving that it works properly.

This same invention may be applied to toys, friction vehicles, war vehicles, sports, etc.

Photographs of an adapted toy are also included.

Movement is provided through a device similar to a bicycle (human force) but in general it is possible to use any motion device which impels the axle that joins the spheres or marine motors with propellers, or sails, etc.

All floaters are provided with small wings so that in contact with water they roll.

Figure 2:
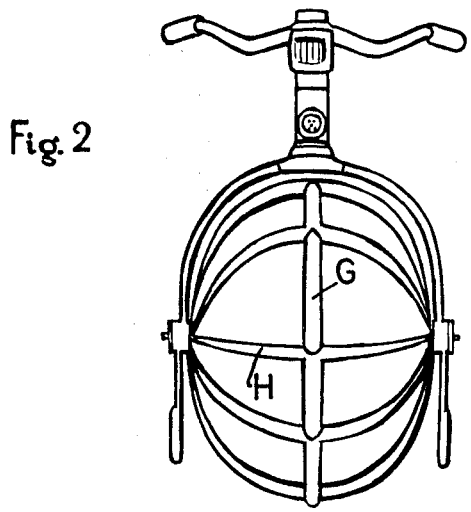
FIG. 2 illustrates a modification of the sphere making same flatter at both poles, similar to a wheel, which, as may be noted is surrounded by a rink marked G which permits same to roll over land. The hinges surrounding same, marked H, are placed horizontally and slightly slanted, and permit the vehicle to roll over the surface of water.
Figure 3:
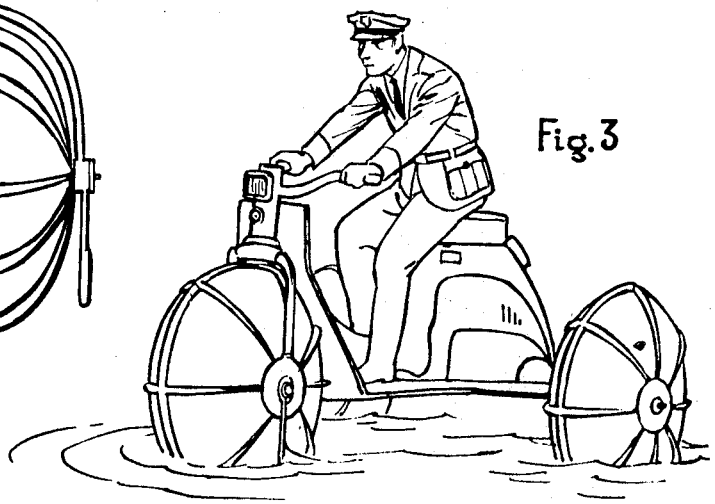
FIG. 3 shows the possibility of constructing a motorized tricycle which could be used for patrolling in water, muddy areas, etc. and lastly on a small scale could be manufactured as a toy.

One helm is located in each side of the front floater and are moved by the handle simultaneously with the floater (FIG. 2) as the front wheel of a bicycle.

LIST OF FIGURES (1) General view of a common tricycle transformed in an amphibious-cycle.
(2) Detail of helm.
(3) Illustration of several uses.

I claim:
1. A rotary float for mounting on an axle consisting of a sphere, cylinder, wheel and the like, ribs disposed radially relative to the axis of rotation, a central circumferential rib, floats in the form of spheres that are flatter at both poles and having a specific weight that is lighter than water and capable of being selectively inflated and deflated, slanted projections in the sense of direction of steering disposed in a horizontal formation and tapering narrower at the poles forming enlarged cavities, where water is retained and same are crossed by the center and surrounding the floater vertically by a rib, ring, and the like rigidly welded to the same and projecting over projections, small rudders and the like, the float bearing two or more rotation axes.

References Cited
UNITED STATES PATENTS

| | | | |
|---|---|---|---|
| 728,758 | 5/1903 | Piller | 115—2 |
| 2,323,261 | 6/1943 | Vigo | 115—2 |
| 2,432,107 | 12/1947 | Williams | 115—1 |
| 3,091,209 | 5/1963 | Lieberman | 115—2 |
| 3,354,861 | 11/1967 | Wilcox et al. | 115—19X |

FOREIGN PATENTS

| | | | |
|---|---|---|---|
| 17,294 | 1889 | Great Britain | 115—2 |
| 70,575 | 12/1958 | France | 115—2 |
| | | (addition to 1,122,181) | |

ANDREW H. FARRELL, Primary Examiner

U.S. Cl. X.R.

115—19